(12) United States Patent
Flerchinger et al.

(10) Patent No.: US 6,955,520 B2
(45) Date of Patent: Oct. 18, 2005

(54) REFUSE COLLECTION VEHICLE AND METHOD WITH STACKABLE REFUSE STORAGE CONTAINER

(75) Inventors: Gary Flerchinger, Hixson, TN (US); Marcel G. Stragier, Scottsdale, AZ (US)

(73) Assignee: Delaware Capital Formation, Inc., Wilmington, DE (US)

( * ) Notice: Subject to any disclaimer, the term of this patent is extended or adjusted under 35 U.S.C. 154(b) by 272 days.

(21) Appl. No.: 10/624,694

(22) Filed: Jul. 22, 2003

(65) Prior Publication Data

US 2005/0019147 A1 Jan. 27, 2005

(51) Int. Cl.⁷ .............................................. B65G 35/50
(52) U.S. Cl. .................................. 414/788.2; 414/332
(58) Field of Search ............................... 414/809, 332, 414/788.2, 797.6, 352, 403

(56) References Cited

U.S. PATENT DOCUMENTS

| | | |
|---|---|---|
| 3,202,805 A | 8/1965 | Amdahl et al. |
| 3,365,087 A | 1/1968 | Boedel et al. |
| 3,370,525 A | 2/1968 | Bowles |
| 3,380,600 A | 4/1968 | Klunner |
| 3,817,415 A | 6/1974 | Lewis |
| 3,881,613 A | 5/1975 | Torimoto et al. |
| 4,096,959 A | 6/1978 | Schaffler |
| 4,113,120 A | 9/1978 | Pickrel |
| 4,120,407 A | 10/1978 | Baur et al. |
| 4,128,182 A | 12/1978 | Pickrell |
| 4,173,423 A | 11/1979 | Pickrell |
| 4,281,956 A | 8/1981 | Pickrell |
| 4,934,896 A | 6/1990 | Quinto |
| 4,986,716 A | 1/1991 | Winter |
| 5,064,332 A | 11/1991 | Edelhoff et al. |
| 5,281,073 A * | 1/1994 | Gesuale ...................... 414/421 |
| 5,335,789 A * | 8/1994 | Taravella et al. ........... 206/518 |
| 5,376,213 A | 12/1994 | Ueda et al. |
| 5,401,137 A * | 3/1995 | Nijenhuis .................... 414/679 |
| 5,562,390 A | 10/1996 | Christenson |
| 5,662,450 A | 9/1997 | Roberts |
| 5,725,350 A | 3/1998 | Christenson |
| 5,785,328 A * | 7/1998 | Eckloff .................. 280/33.998 |
| 5,829,946 A | 11/1998 | McNeilus et al. |
| 5,938,393 A | 8/1999 | Georg |
| 6,050,769 A * | 4/2000 | Papalia et al. .............. 414/408 |
| 6,497,547 B1 * | 12/2002 | Maglaras ................. 414/525.2 |
| 6,616,400 B1 * | 9/2003 | Caponey ..................... 414/809 |

* cited by examiner

*Primary Examiner*—Richard Ridley
(74) *Attorney, Agent, or Firm*—Parsons & Goltry; Robert A. Parsons; Michael W. Goltry (57) ABSTRACT

A stackable refuse collection container including a body having a bottom and an open top, the body constructed to be nestingly stacked with at least one similar body through the open top. A cover is formed to engage the body and close the top. An engagement mechanism is coupled to the body and the cover, the engagement mechanisms moveable between an engaged position securing the cover onto the body to allow compaction of refuse therein, and a disengaged position permitting removal of the cover from the open top. A loading door is formed in an end of the body for receiving refuse from a compactor mechanism.

29 Claims, 10 Drawing Sheets

REFUSE COLLECTION VEHICLE AND METHOD WITH STACKABLE REFUSE STORAGE CONTAINER

FIELD OF THE INVENTION

This invention relates to refuse collection.

More particularly, the present invention relates to the collection and transport of refuse.

In a further and more specific aspect, the instant invention concerns a stackable container for storing and transporting collected refuse.

BACKGROUND OF THE INVENTION

Refuse collection has long been required and will continue to be needed. There are many types of refuse collection vehicles, containers and systems that have been developed over the years. Many of the vehicle improvements have focused on automating the refuse collection process. Thus, the speed and efficiency in which refuse is collected has dramatically increased. Unfortunately, the cost of the vehicles has also increased with the automation. Since the vehicles are only more efficient in the collection of refuse, the time it takes to transport and offload the refuse severely reduces inefficiency and increases the cost of handling refuse.

Even refuse collection vehicles that have been known for many years use specialized equipment, such as a hopper for receiving refuse and a packer mechanism for moving the refuse into a collection body. This equipment adds expense and weight to the vehicle which reduces efficiency and increases cost during the transport of the refuse.

Various techniques and systems have been developed to try and maximize the efficient use of automated vehicles and other refuse collection vehicles having refuse handling devices. Transfer stations are one solution. In this instance, refuse is offloaded at a central facility and repackaged for transport. While increasing the time automated or other specialized vehicles are used for collection, transfer stations are expensive to operate and labor intensive.

A very effective system incorporates a removable container on a refuse collection vehicle. In this system, a vehicle collects refuse in a container using a rear loading mechanism. The container can then be removed from the vehicle and transported by conventional container vehicles to a desired location. In this manner, the vehicle can be continually employed for refuse collection, while another vehicle can be used for transportation of the container. The primary problem with this system is that while the specialized collection devices are used at maximum efficiency, the transport vehicles are required to carry loaded containers in one direction and empty containers on the return trip. Thus, the efficiency of the transport vehicles is not maximized.

It would be highly advantageous, therefore, to remedy the foregoing and other deficiencies inherent in the prior art.

Accordingly, it is an object of the present invention to provide a new and improved refuse collection vehicle.

Another object of the invention is to provide a new and improved stackable container for use on a refuse collection vehicle.

And another object of the invention is to provide an efficient method of collecting and transporting refuse employing a stackable container.

Still another object of the present invention is to provide a system for the efficient use of refuse collection vehicles and transport vehicles.

SUMMARY OF THE INVENTION

Briefly, to achieve the desired objects of the instant invention in accordance with a preferred embodiment thereof, provided is stackable refuse collection container and refuse collection vehicle. The refuse collection vehicle includes a chassis carrying a compaction mechanism. The stackable refuse collection container is removably carried by the chassis adjacent the compaction mechanism. The container includes a body having a bottom and an open top, the body constructed to be nestingly stacked with at least one similar body through the open top. A cover is provided and formed to engage the body and close the top. An engagement mechanism is coupled to the body and the cover, the engagement mechanisms moveable between an engaged position securing the cover onto the body to allow compaction of refuse therein by the compaction mechanism, and a disengaged position permitting removal of the cover from the open top. A loading door is formed in an end of the body adjacent the compaction mechanism for receiving refuse from the compaction mechanism.

Also provided is a method of collecting refuse including the steps of providing a refuse collection vehicle including a chassis carrying a compaction mechanism. A plurality of empty stackable refuse collection container are provided, the plurality of containers each including a body having a bottom and an open top constructed to be nestingly stacked with at least one of the remaining plurality of containers through the open top. A cover is formed to engage the body and close the top. An engagement mechanism is coupled to the body and the cover, the engagement mechanisms moveable between an engaged position securing the cover onto the body to allow compaction of refuse therein by the compaction mechanism, and a disengaged position permitting removal of the cover from the open top, and a loading door formed in an end of the body. An empty first one of the plurality of containers, with an engaged cover, is mounted on the chassis of the refuse collection vehicle with loading door positioned adjacent the compaction mechanism for receiving refuse from the compaction mechanism. Refuse is introduced and compacted in the first one of the plurality of containers using the compacting mechanism. The first one of the plurality of containers with compacted refuse therein is removed from the chassis, and an empty second one of the plurality of containers is mounted on the chassis of the refuse collection vehicle with loading door positioned adjacent the compaction mechanism for receiving refuse from the compaction mechanism.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings, in which.

DETAILED DESCRIPTION OF THE PREFERRED EMBODIMENT

Figure 1:
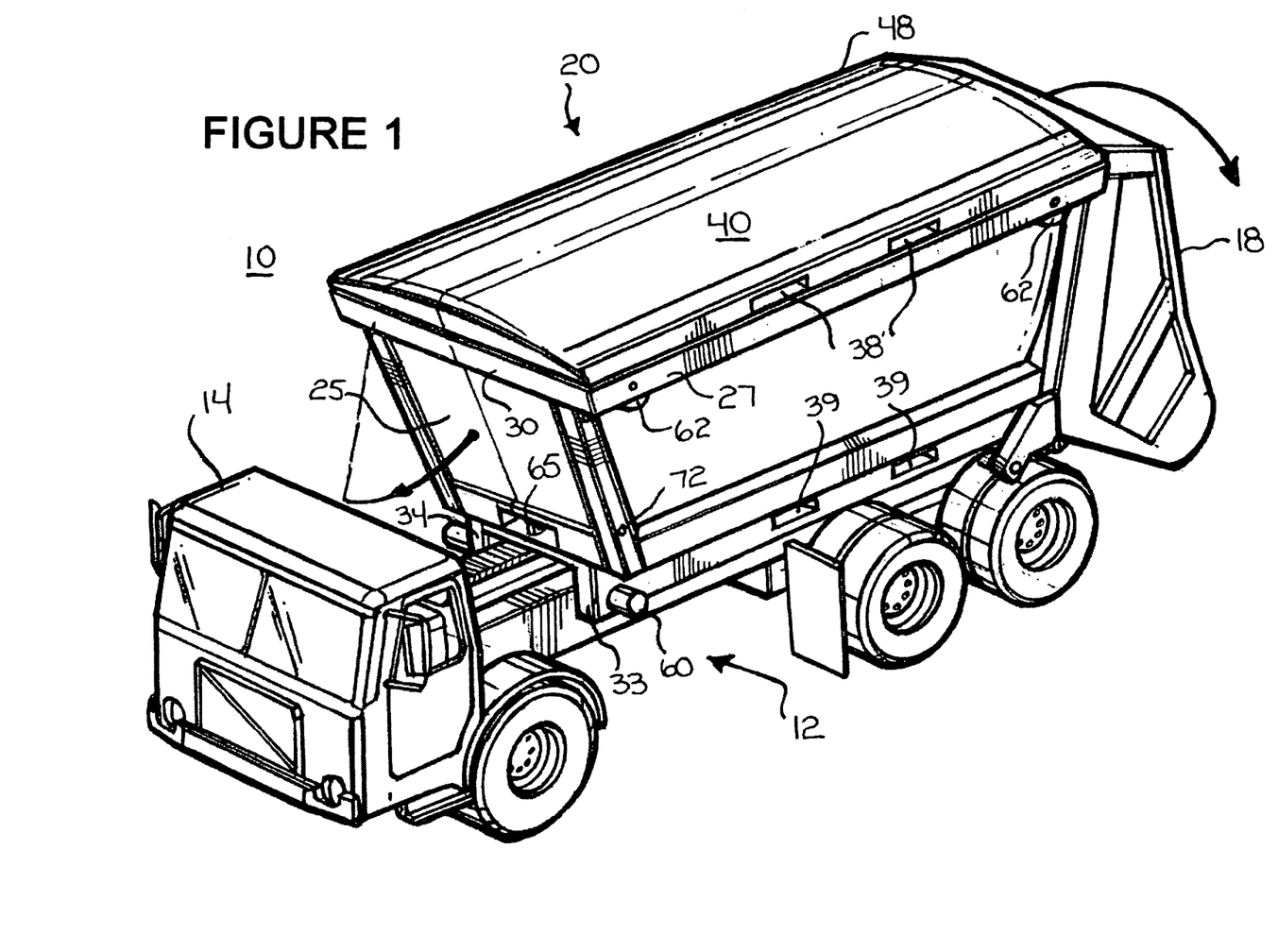
FIG. 1 is a perspective view illustrating a refuse collection vehicle and container according to the present invention.

Turning now to the drawings in which like reference characters indicate corresponding elements throughout the several views, attention is first directed to FIG. 1 which illustrates a refuse collection vehicle generally designated 10. Vehicle 10 includes a chassis 12, a cab 14 carried at one end thereof and a tailgate assembly 18 carried at an opposing end of chassis 12. A container 20 is carried intermediate cab 14 and tailgate assembly 18. Tailgate assembly 18 will not be described in detail as it is fully described in co-pending provisional patent application Ser. No. 60/399,942, filed 30 Jul. 2002, entitled REAR LOADER COLLECTION VEHICLE WITH DETACHABLE CONTAINER, included by reference herein and is only one of many possible loading mechanisms. Assembly 18 loads refuse into container 20. Container 20 can then be removed and transported to a desired site, as will be described presently.

Figure 2:
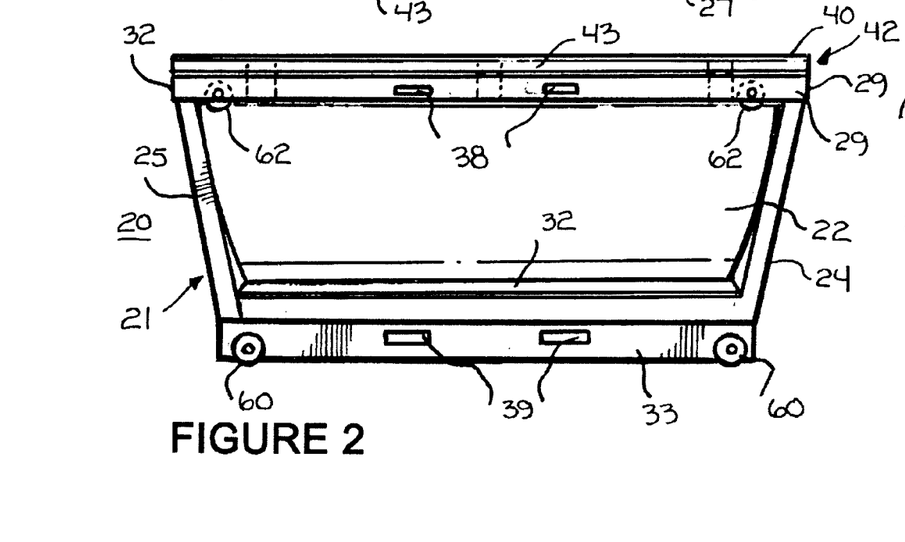
FIG. 2 is a side view of the container of FIG. 1.
Figure 3:
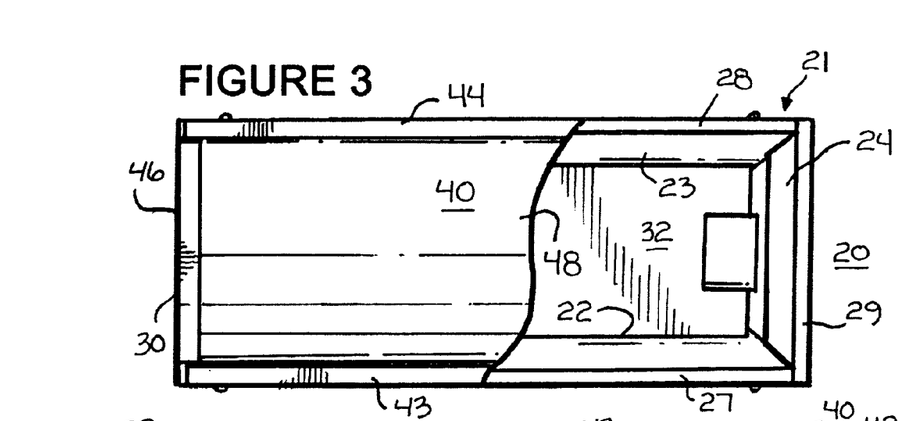
FIG. 3 is a top view of the container of FIG. 2, with portion thereof cut away.
Figure 4:
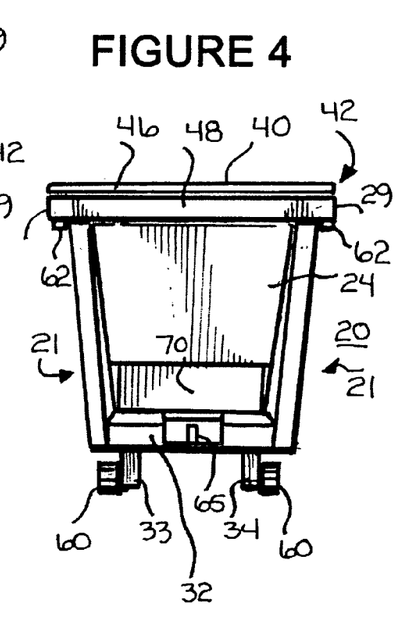
FIG. 4 is an end view of the container of FIGS. 2 and 3.

With additional reference to FIGS. 2–4, container 20 includes a body 21 which includes opposing side walls 22 and 23 joined by opposing end walls 24 and 25. An upper edge of body 21 is formed by substantially parallel top rails 27 and 28 and end rails 29 and 30. Side walls 22 and 23, and end walls 24 and 25 slant inwardly toward a bottom 32 to define a volume larger at the top than at the bottom. In other words, an area of the open top is larger than the area of the bottom. In this manner, body 21 can be stacked within another body 21 in a nesting arrangement for purposes to be described presently. Substantially parallel bottom rails 33 and 34 extend along an outer surface of bottom 32 from end wall 24 to end wall 25. A pair of apertures 38 extends through top rail 27, aligned with a pair of apertures (not shown) in top rail 28. Another pair of apertures 39 extends through bottom rail 33, aligned with a pair of apertures (not shown) in bottom rail 34.

Container 20 further includes a cover 40 overlying and securely engageable to top rails 27 and 28 of body 21. Cover 40 includes a frame 42 having side rails 43 and 44, joined by end rails 45 and 46. Frame 42 is sized to correspond with and overlie top rails 27 and 28 and end rails 29 and 30. A cover panel 48 is positioned within frame 42 to complete cover 40. Cover panel 48 may be curved as shown, to provide increased rigidity and strength. This becomes important to permit compaction of refuse within container 20. While apertures 38 are shown formed through top rails 27 and 28 in FIG. 2, it will be understood that apertures, designated 38' here to indicate a different embodiment, can extend through rails 43 and 44 of cover 40, if desired. Alternatively, other lifting structures can be provided, such as brackets affixed to frame 42 by some convenient method, e.g. welding or the like, to define openings.

Figures 5, 6, 7, 8:
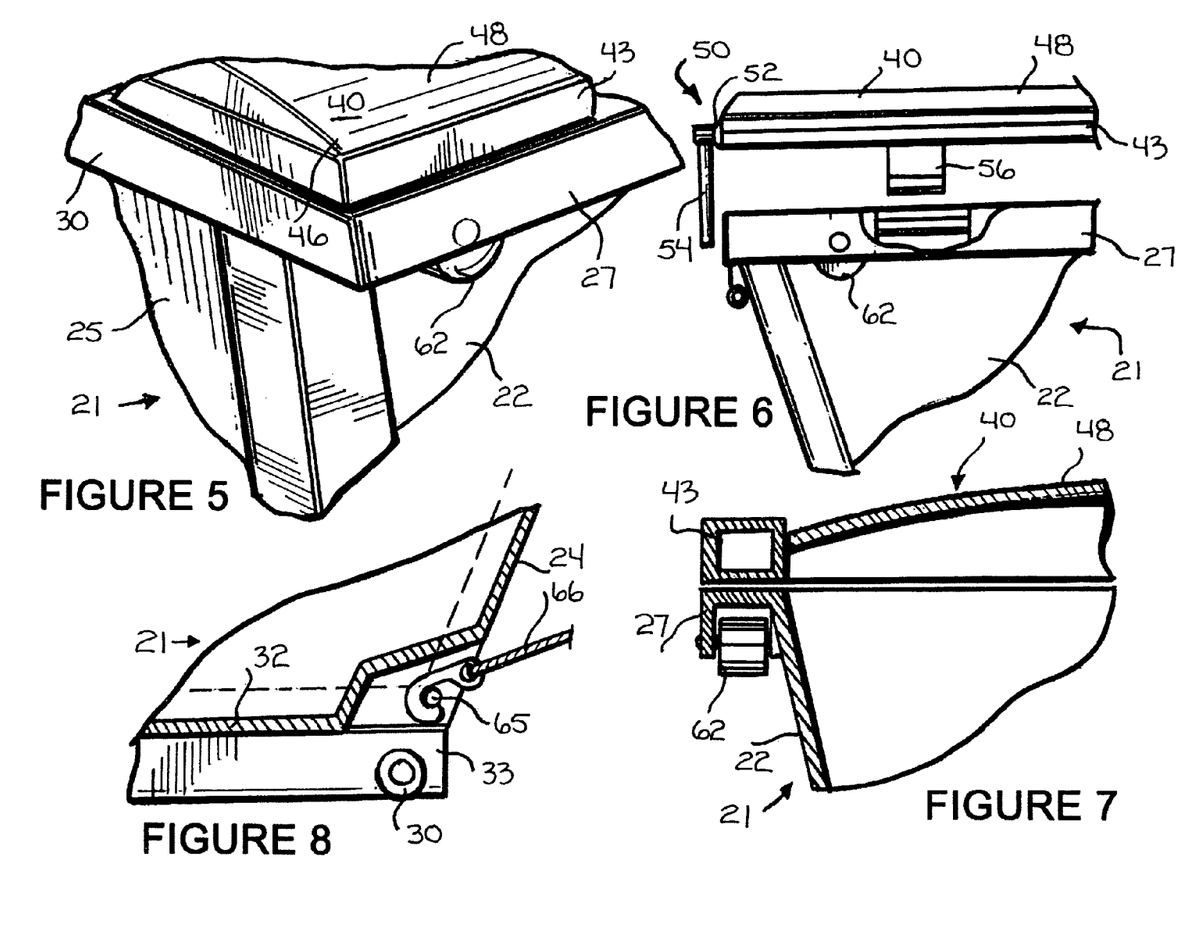
FIG. 5 is a partial perspective view of a top roller of the container.
FIG. 6 is a partial side view of the container with a cover removed therefrom.
FIG. 7 is a partial sectional side view of the container and cover.
FIG. 8 is a partial sectional side view of the container and lower roller.
Figures 9, 10:
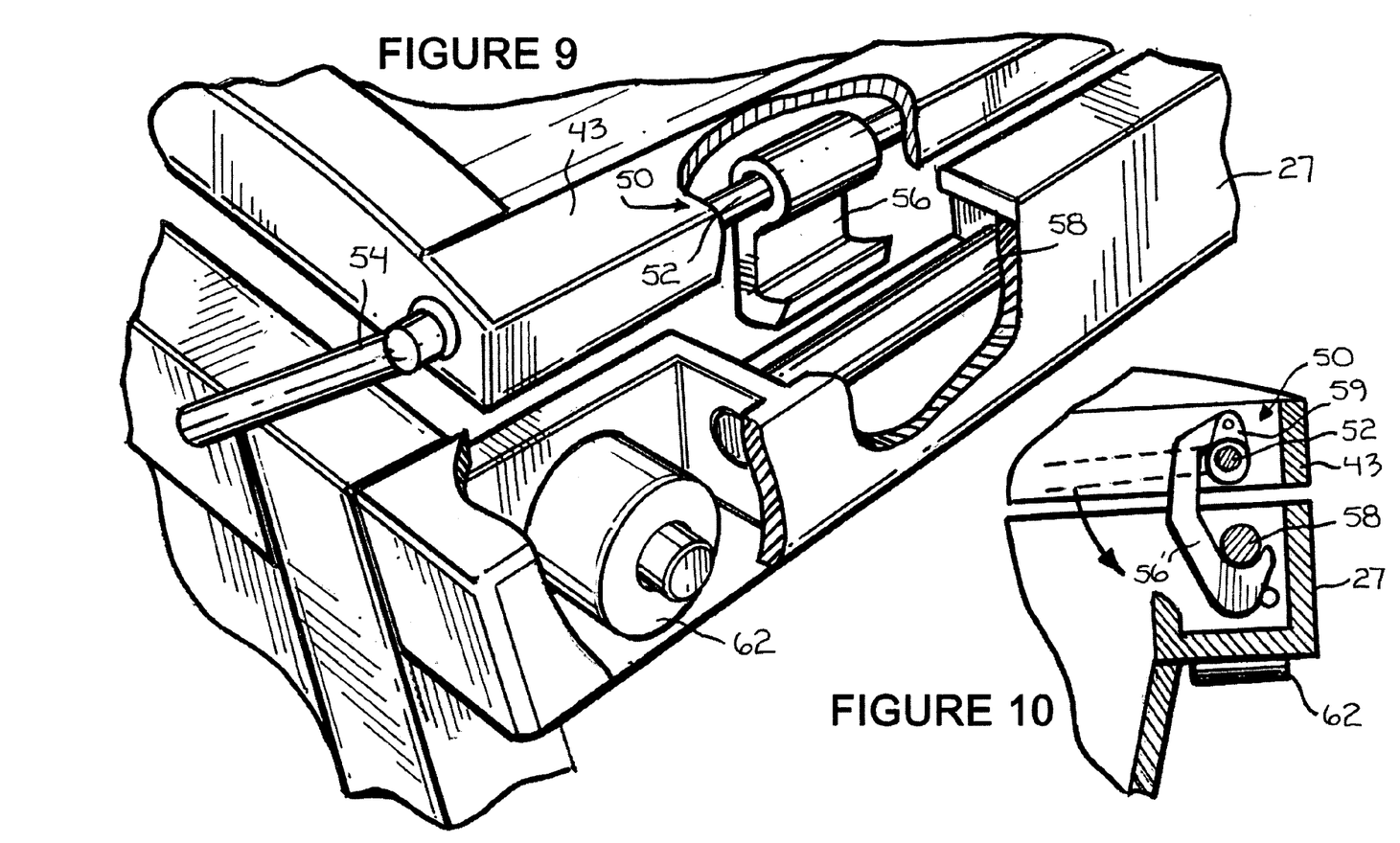
FIG. 9 is a partial perspective view of the container and cover, with portions thereof broken away to illustrate an engagement mechanism.
FIG. 10 is a partial sectional side view illustrating the engagement mechanism of FIG. 9 in the engaged position.

Referring additionally to FIGS. 6, 9, and 10, an engagement mechanism, generally designated 50, is illustrated for securing cover 40 to body 21. Engagement mechanism 50 includes a shaft 52 positioned within and parallel to side rail 43 of cover 40. Shaft 52 is rotatably mounted at opposite ends in end rails 29 and 30 of cover 40. One or both of the ends of shaft 52 are accessible at the exterior for receiving a handle 54. Handle 54 is employed to rotate shaft 52 for movement of mechanism 50 between an engaged position and a disengaged position as will be described presently. A latch 56 is carried by shaft 52 and extending downwardly from rail 43 to engage an anchor 58 carried by top rail 27. In the embodiment illustrated in FIG. 9, latch 56 is simply a hook rotated by shaft 52 so as to engage anchor 58 in the engaged position. Anchor 58 is a fixedly mounted horizontal rod carried within top rail 27. Latch 56 extends through a slot formed in top rail 27 to access anchor 58. Turning to FIG. 10, a locking latch 56' is illustrated. Latch 56' is mounted to shaft 52 with a linkage 59. Linkage 59 is fixedly coupled to shaft 52 for rotation therewith. Latch 56' is pivotally attached to linkage 59. By providing linkage 59, latch 56' can be locked into the engaged position by rotating shaft 52 to a position wherein linkage 59 is over center. It should be understood that while a single latch is illustrated, a plurality of latches may be affixed to shaft 52 with associated anchors. Additionally, a similar shaft and latch arrangement is carried by side rail 44 of cover 40 and anchors by top rail 28 of body 21 to complete engagement mechanism 50. Also, it should be understood that latches 56 can instead be carried by top rail 27 and/or top rail 28 and anchors 58 carried by side rail 43 and/or side rail 44. It is also contemplated that one side of cover 40 may be hingedly attached to body 21 and only the opposing side including engagement mechanism 50. To provide covers hanging in the manner shown in FIG. 15, offset hinges can be employed.

It will be understood by one skilled in the art, that while shafts 52 have been described as extending substantially the length of rails 43 and 44, in the embodiment illustrated in FIG. 1, short shaft segments on each corner would be employed. Shafts extending the entire length are not employed in this embodiment due to the presence of apertures 38' formed in cover 40.

Referring to FIGS. 2, 4, 5 and 7 lower rollers 60 are mounted on bottom rails 33 and 34 to facilitate movement of container 20 on a planar surface for purposes which will be described presently. Upper rollers 62 are mounted in top rails 27 and 28 and directed downwardly so as to extend below a lower portion thereof. Lower roller 60 and upper rollers 62 are preferably mounted adjacent the corners of body 21. It should be understood that rollers 60 and 62 are optional and can be omitted if desired. An anchor 65 is carried within an inset formed in body 21 proximate bottom 32. Anchor 65 permits engagement of a winch line 66 (see FIG. 8) for moving body 21. It will be understood that an anchor can be provided at one or both ends of body 21.

Figures 11, 12, 13:
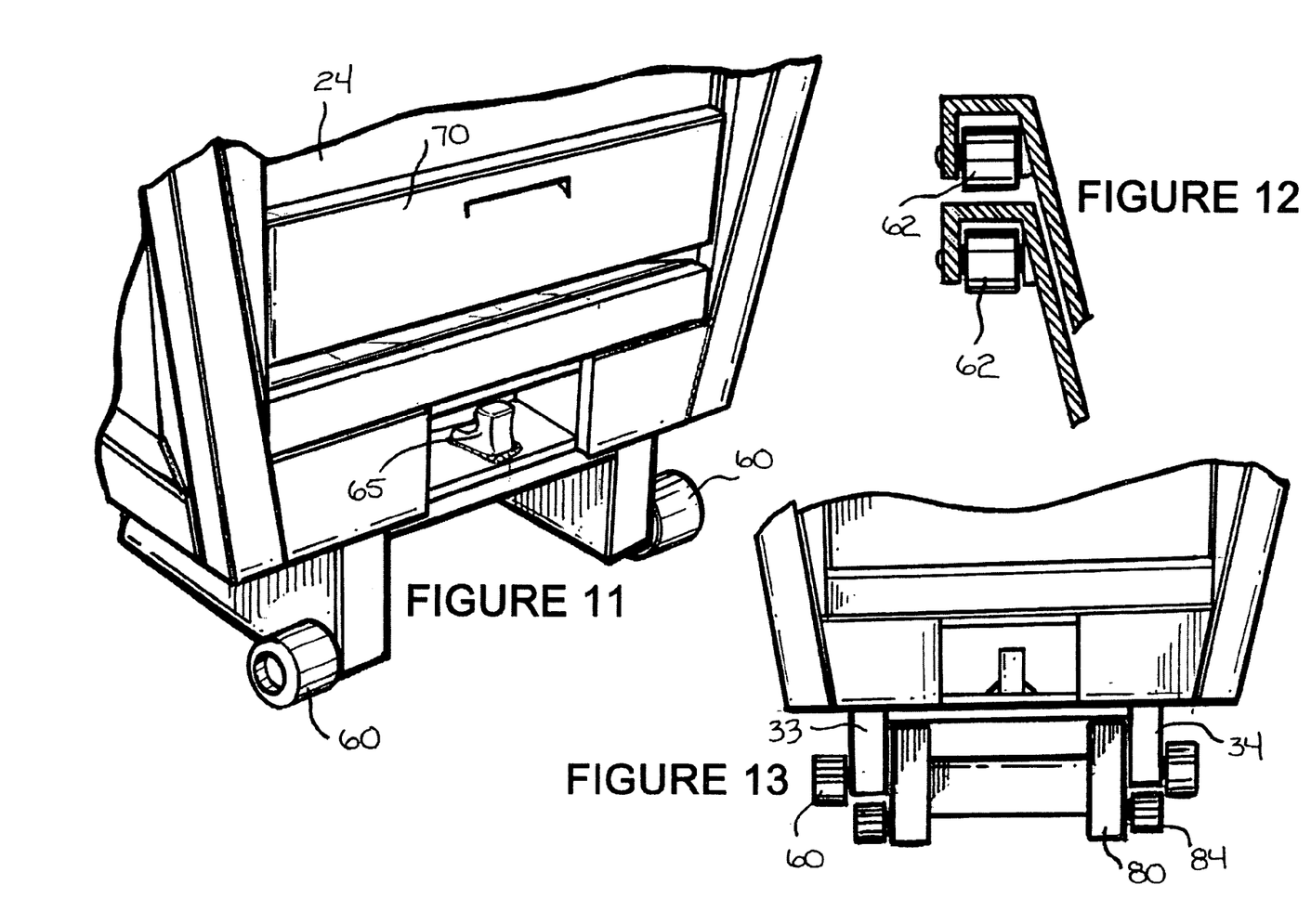
FIG. 11 is a partial perspective view illustrating an end of the container.
FIG. 12 is a partial sectional end view illustrating the upper rollers of a pair of stacked containers.
FIG. 13 is a partial end view illustrating a container on a roll-on chassis.

Referring back to FIG. 1, with additional reference to FIG. 11, container 20 is intended to be employed with a loading mechanism such as tailgate 18. Thus, end wall 24 includes a loading door 70, which can have many different forms depending on the loading mechanism employed, some of which will be described presently. Additionally, while refuse can be discharged from body 21 from the top when cover 40 is removed, end wall 25 can be hinged to provide an egress for refuse. In this case, end wall 25 is hinged or pivoted adjacent the top and pinned at the bottom with pins 72. In this manner, when pins 72 are removed, refuse can be discharged from the end of container 20.

Figure 14:
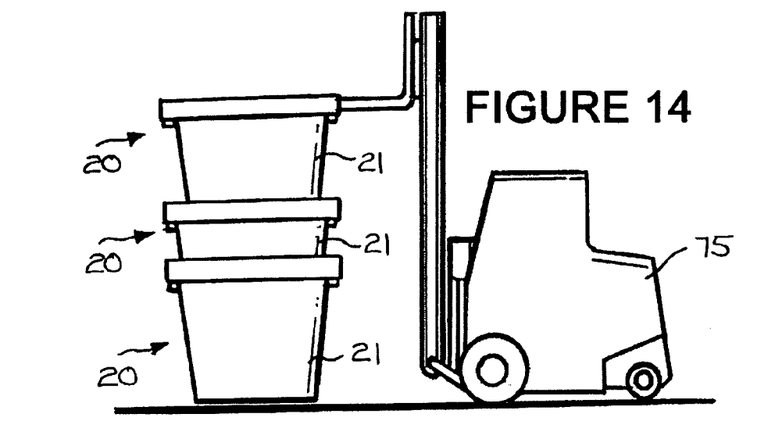
FIG. 14 is a simplified side view illustrating a method of stacking containers of the present invention.
Figure 15:
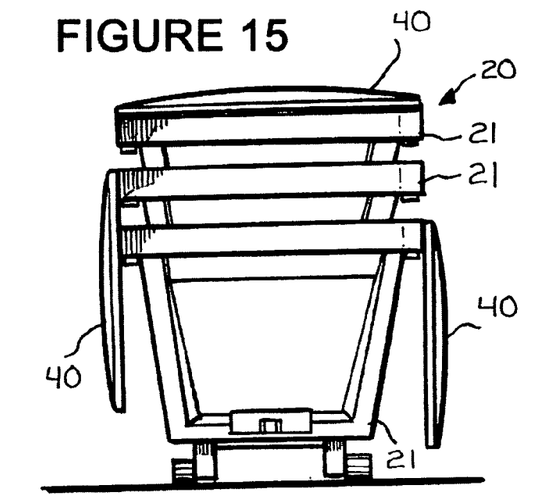
FIG. 15 is an end view illustrating stacked containers according to the present invention.

Turning now to FIGS. 14 and 15, covers 40 are removed allowing bodies 21 to be stacked in a nesting arrangement for shipment. This can be accomplished using a fork lift 75, or the like as shown in FIG. 14. In this case, the forks of lift 75 are inserted through apertures 38, allowing body 21 to be lowered into another body 21. It will also be understood by those skilled in the art that cover 40 can remain on a body to be stacked. In this case, the forks of lift 75 are inserted through apertures 38'. Cover 40 can then be removed to permit stacking of additional bodies 21. Referring specifically to FIG. 15, one bodies 21 are nestingly stacked, covers 40 can be positioned as illustrated.

Figure 17:
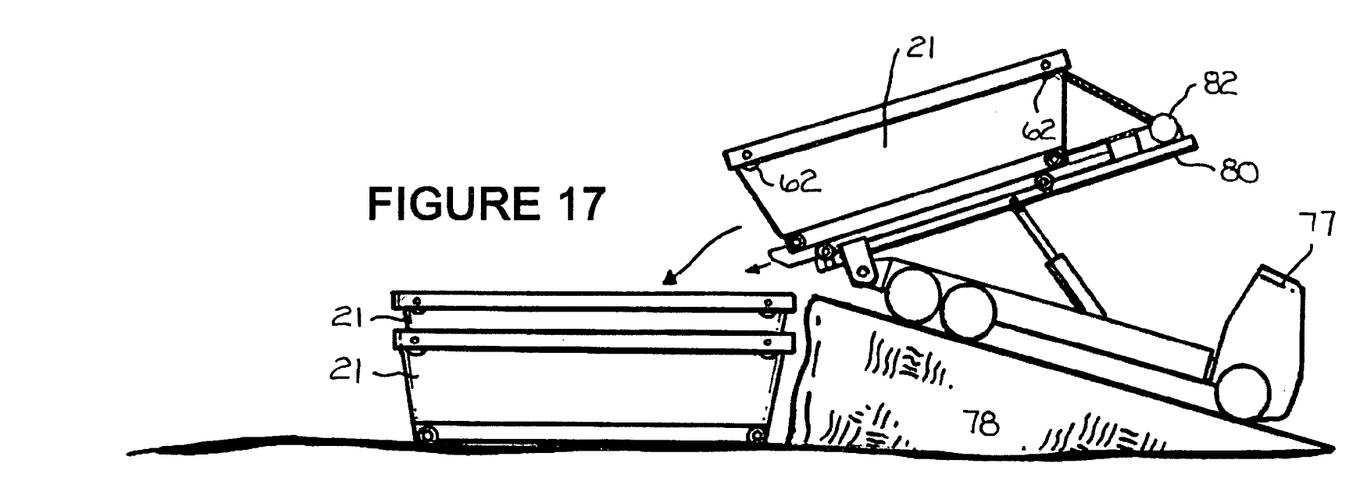
FIG. 17 is a simplified side view illustrating another method of stacking the containers according to the present invention.

Referring to FIG. 17, another method of stacking bodies 21 is illustrated. In this method, a roll off vehicle 77 is carrying body 21. A ramp 78 is utilized to position vehicle 77 above the stack of bodies 21. In the stacking operation, a bed 80 of roll off vehicle 77 is raised and a winch 82 is employed to lower body 21 onto the stack. It will be understood that roll-off vehicle 77 is of conventional design, and includes a plurality of rollers 84 upon which bottom rails 33 and 34 ride, as can be seen in FIG. 13. To facilitate nesting stacking, and reduce wear and possible damage to bodies 21, upper rollers 62 ride upon the upper surface of upper rails 27 and 28 of any previously stacked bodies (see FIG. 12).

Figure 19:
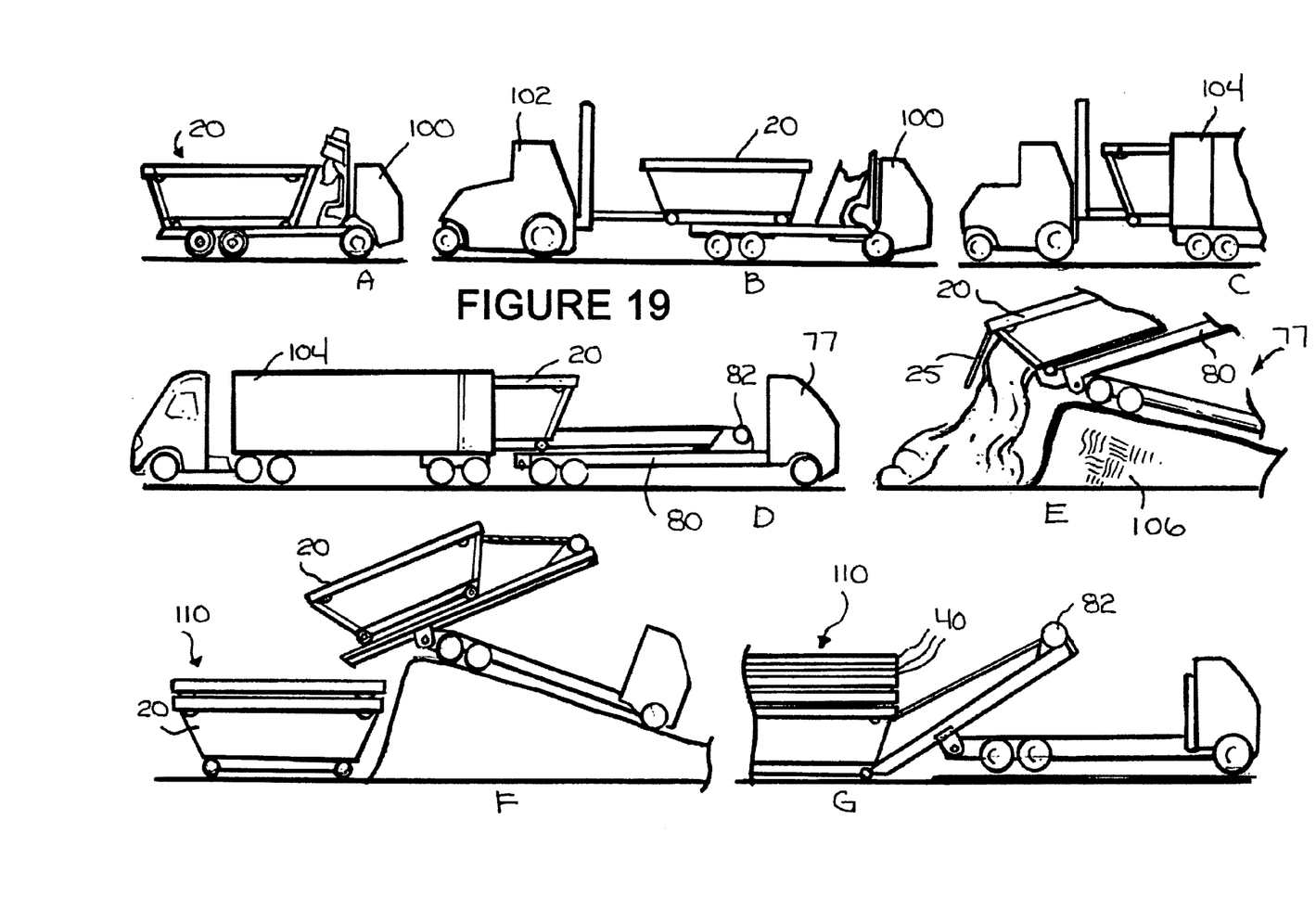
FIG. 19 schematically illustrates various steps A–G in a sequence of collecting refuse in a container, transporting and returning the container according to a method of the present invention.
Figure 20:
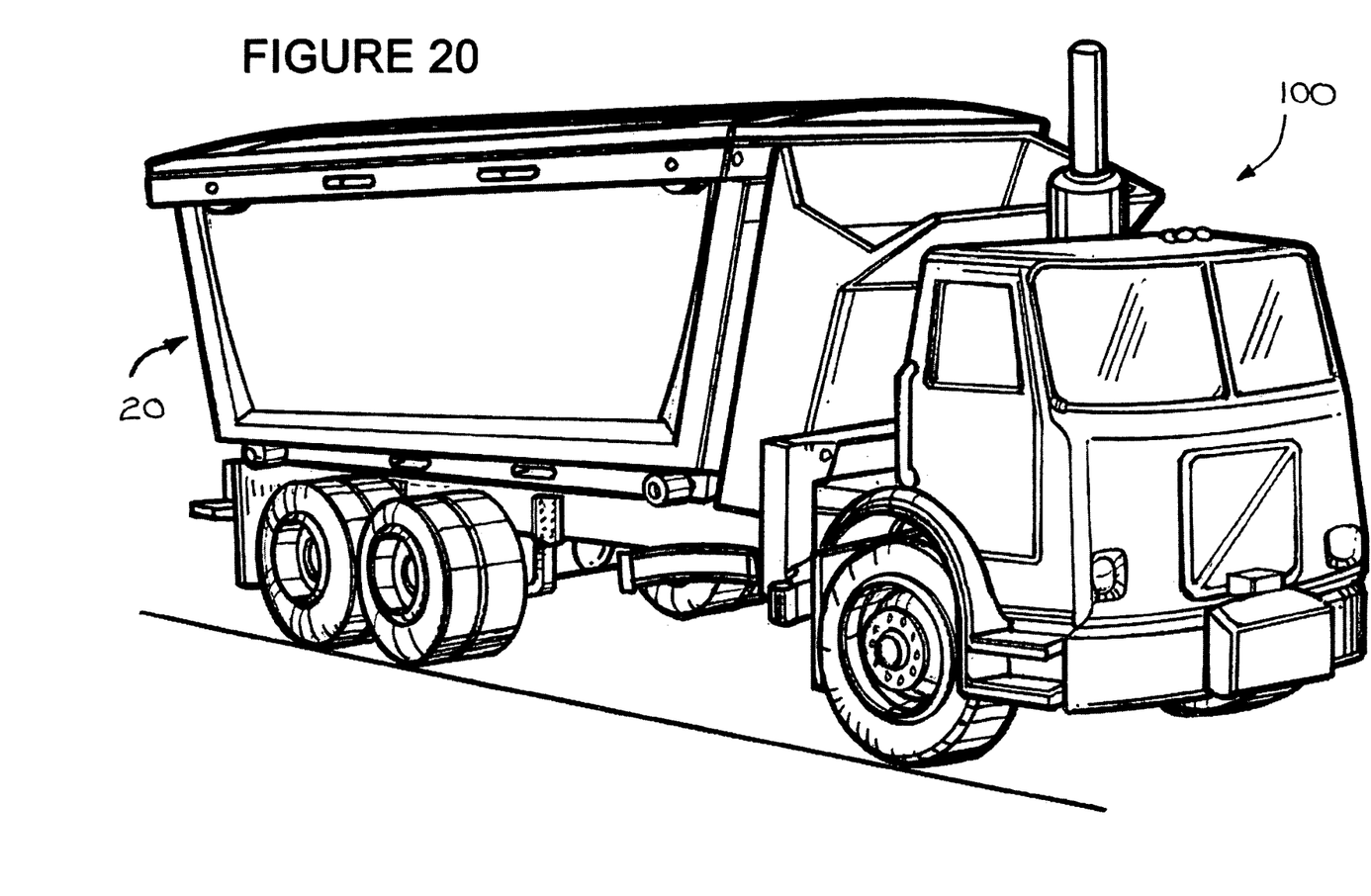
FIG. 20 is a perspective view illustrating another embodiment of a refuse collection vehicle and container according to the present invention.

Referring now to FIG. 19, A–G, a method of collecting and transporting refuse is illustrated. By this method, refuse collecting devices are employed for the specialized purposes of collecting refuse and not transporting refuse. Transport vehicles, not having the specialized collection devices, are used to transport materials in both directions, so as to reduce or eliminate empty loads. In FIG. 19 step A shows a refuse collection vehicle 100 of the side loader type. Side loader vehicle 100 is illustrated in more detail in FIG. 20. It will be understood that the refuse collection vehicle can be any vehicle capable of carrying container 20 and loading refuse therein, such as vehicle 10 having tailgate 18. Vehicle 100 collects, compacts and stores refuse within container 20.

Figure 16:
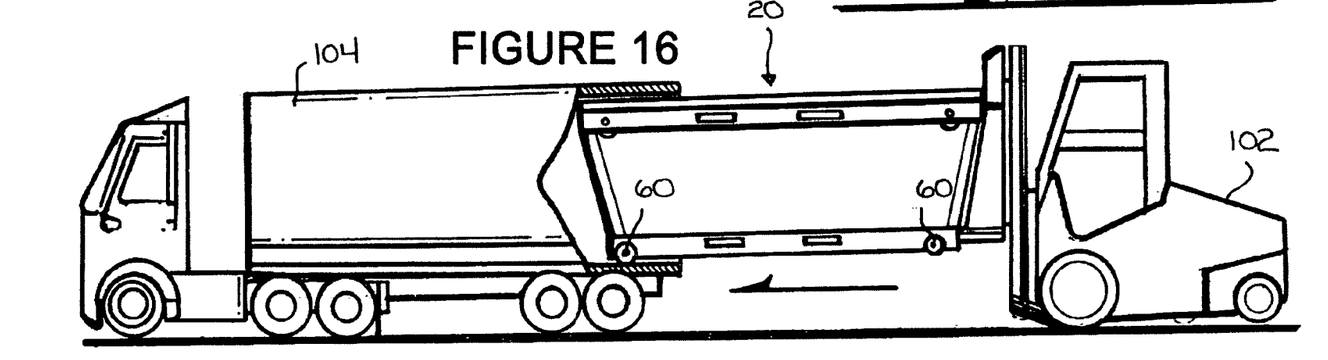
FIG. 16 is a simplified side view illustrating a container being loaded into a van according to the present invention.

Container 20 is then removed from vehicle 100 by a fork lift 102 (step B) and inserted into a transport vehicle, such as van 104 (step C). After removing a filled container 20, it will be understood that forklift 102 can then place an empty container 20 onto vehicle 100. With additional reference to FIG. 16, fork lift 102 slides container 20 into van 104 using rollers 60 (if present). Van 104 is an example of a transport vehicle, which generally can be any of a semi-trailer in an articulated vehicle, a fixed body truck, a flatbed trailer, etc. It will be understood that roll off vehicle 77 can also be used as a transport vehicle. In a typical scenario, van 104 brings a load of material to a location, and leaves with a filled container 20 for delivery to a desired location, thereby employing van 104 for substantially one hundred percent of the time instead of fifty percent.

Step D includes removing container 20 from the transport vehicle, e.g. van 104, when it reaches the desired location. Removal is preferably accomplished employing roll off vehicle 77. Container 20 is removed from van 104 using winch 82 and moved onto bed 80 of roll off vehicle 77. Roll off vehicles, such as vehicle 77, are widely used in the industry for a variety of applications, e.g. delivering and picking up roll off containers at private and industrial locations. Roll off vehicles are generally available at refuse disposal sites, either as a vehicle that happens to be present or as a dedicated vehicle supplied by the owner of the site or the company using vehicles 100 and containers 20. In step E, roll off vehicle 77 empties container 20 using a ramp 106 provided for that purpose (if necessary). In this specific example, refuse is discharged through wall 25, after releasing pins 72.

Figure 18:
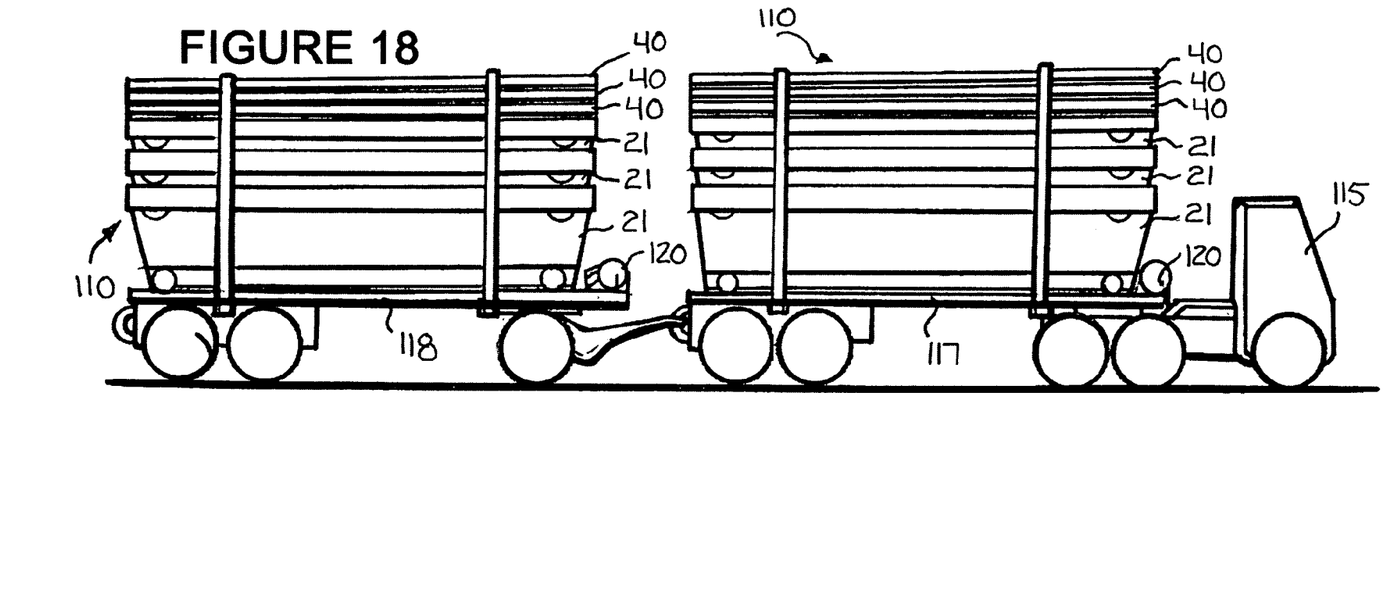
FIG. 18 is a simplified side view of a vehicle carrying stacked containers.

After emptying container 20, roll off vehicle 77 moves to ramp 78 and stacks the recently emptied container 20 onto a stack 110 of previously emptied and stacked containers 20, generally as previously described with reference to FIG. 17. When stack 110 reaches a desired number, generally three containers 20, roll off vehicle 77 backs up to stack 110 and loads the entire stack onto bed 80, depicted as step G. In this embodiment cover 40 for each container 20 are stacked on top of stack 110. At this point, vehicle 77 can return the empty containers, or transfer the stacks to a vehicle 115 as shown in FIG. 18. In this embodiment, flatbed trailers 117 and 118 are towed behind vehicle 115. Each of trailers 117 and 118 can include winches 120 for pulling stacks 110 onto the respective trailer from roll off vehicle 77. It will be understood that larger trailers may be capable of carrying multiple and/or larger stacks. Furthermore, some roll off vehicles or trailers employ a loading arm instead of a winch. In these cases, the arm can be used in place of the winch for the loading of stacks 110. The arm pushes or pulls the containers. Stacks 110 are then returned for refilling, completing the cycle.

Figure 21:
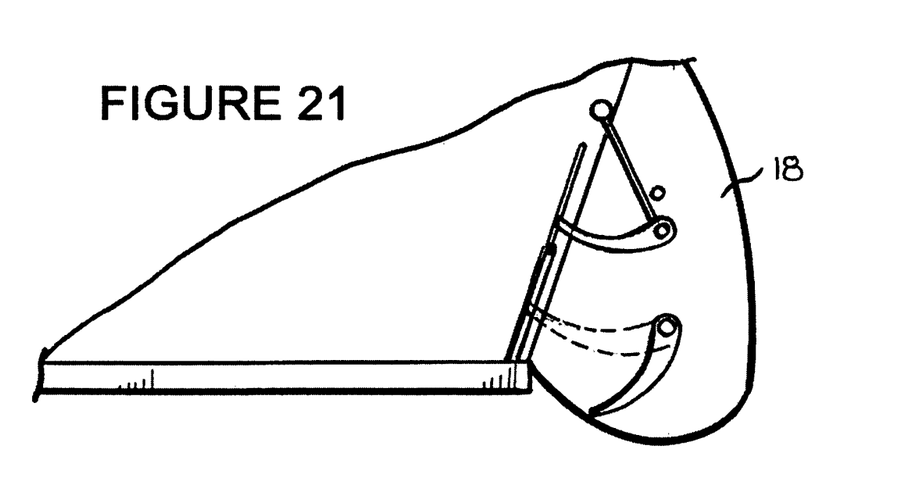
FIG. 21 is a simplified side view of a packing mechanism and loading door of a container according to the present invention.
Figure 22:
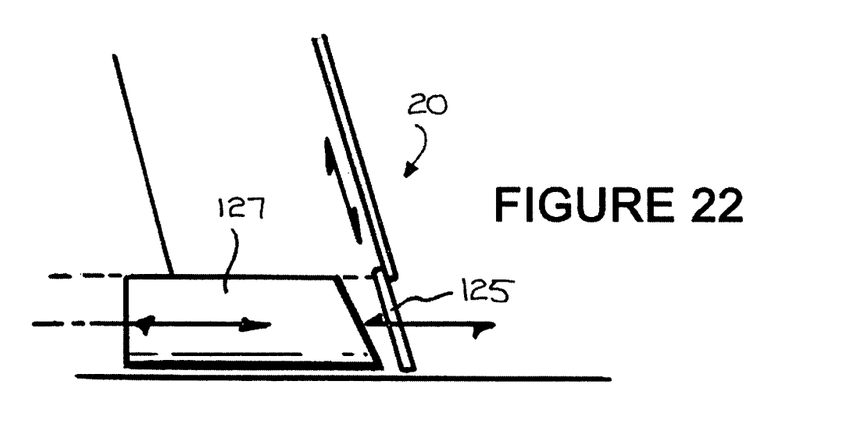
FIG. 22 is a simplified side view of another packing mechanism and loading door of a container according to the present invention.
Figure 23:
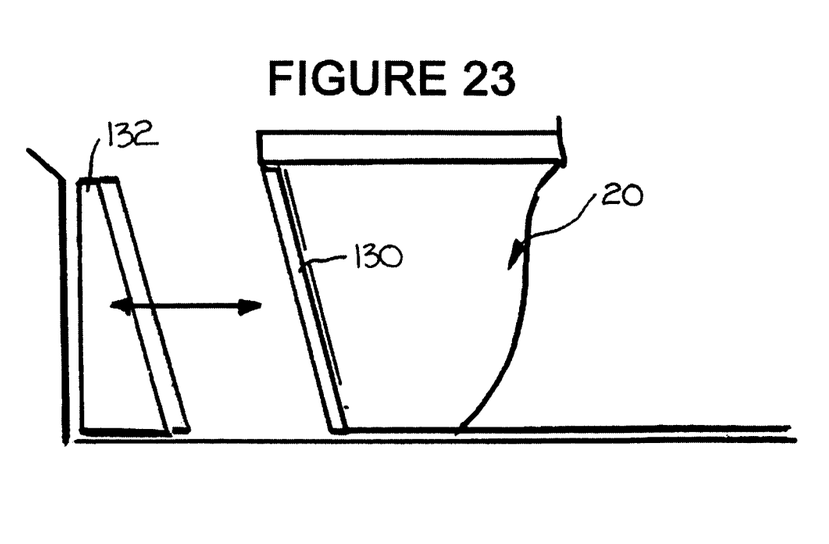
FIG. 23 is a simplified side view of yet another packing mechanism and loading door of a container according to the present invention.

As discussed previously, refuse collection vehicles and their associated loading and compacting mechanisms can be any of a variety of well known devices. Examples of typical loading mechanisms include FIG. 1 which specifically illustrates a rear loading mechanism as provided by tailgate 18, and FIG. 20 which illustrates a side loading mechanism which includes a hopper and compactor at the front of container 20. Loading door 70 of container 20 is configured to cooperate with the selected loading and compacting mechanisms. FIG. 21, for example, illustrates a specific loading door associated with tailgate 18 and disclosed in the above identified provisional application incorporated herein. FIG. 22 shows another type of loading door associated with a side loading mechanism having a compactor at the font of container 20. In this example, a loading door 125 is lifted by a mechanism not shown to permit a compactor 127 to compact refuse therethrough. Turning to FIG. 23, another loading door 130 is illustrated with associated compactor 132. In this example, loading door 130 is fastened to compactor 132 during the collection and compacting process. When container 20 is sufficiently filled, compactor 132 positions loading door 130, which is then fastened to container 20 in position, and unfastened from compactor 132. As stated previously, one skilled in the art will understand that container 20 can be employed with substantially any type of loading and compacting mechanisms. Additionally, substantially any combination of the preceding vehicles can be used in a system for collecting and transporting refuse.

Thus, a new and improved stackable container for use on a refuse collection vehicle has been disclosed. This container allows an efficient method of collecting and transporting refuse as well as the efficient use of refuse collection vehicles and transport vehicles.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

What is claimed is:

1. A stackable refuse collection container comprising:
   a body having a bottom and an open top, the body constructed to be nestingly stacked with at least one similar body through the open top;
   a cover formed to engage the body and close the top;
   an engagement mechanism coupled to the body and the cover, the engagement mechanisms moveable between an engaged position securing the cover onto the body to allow compaction of refuse therein, and a disengaged position permitting removal of the cover from the open top; and
   a loading door formed in an end of the body for receiving refuse from a compactor mechanism.

2. A stackable refuse collection container as claimed in claim 1 wherein the body defines a volume larger at the top than at the bottom.

3. A stackable refuse collection container as claimed in claim 2 wherein the body includes sides slanted inwardly from the top to the bottom to define the volume larger at the top than at the bottom.

4. A stackable refuse collection container as claimed in claim 1 further including lower rails extending along an outer surface of the bottom.

5. A stackable refuse collection container as claimed in claim 4 wherein the lower rails include apertures extending therethrough for receiving a lifting mechanism.

6. A stackable refuse collection container as claimed in claim 4 further including rollers carried by the lower rails.

7. A stackable refuse collection container as claimed in claim 3 further including an upper rail extending along an upper edge of each of the sides.

8. A stackable refuse collection container as claimed in claim 7 wherein the upper rails include apertures extending therethrough for receiving a lifting mechanism.

9. A stackable refuse collection container as claimed in claim 7 further including rollers carried by the upper rails and extending downwardly from a lower portion thereof.

10. A stackable refuse collection container as claimed in claim 1 further including a discharge door formed in an opposing end of the body.

11. A stackable refuse collection container as claimed in claim 1 wherein the cover further includes a lifting structure.

12. A stackable refuse collection container as claimed in claim 11 wherein the lifting structure includes apertures formed through a frame thereof.

13. A stackable refuse collection container as claimed in claim 1 wherein the engagement mechanisms includes securing elements at opposing sides of the top.

14. A stackable refuse collection container as claimed in claim 13 wherein one of the securing elements is a hinge.

15. A stackable refuse collection container and refuse collection vehicle comprising:
   a refuse collection vehicle including a chassis carrying a compaction mechanism; and
   a stackable refuse collection container removably carried by the chassis adjacent the compaction mechanism, the container including:
      a body having a bottom and an open top, the body constructed to be nestingly stacked with at least one similar body through the open top;
      a cover formed to engage the body and close the top;
      an engagement mechanism coupled to the body and the cover, the engagement mechanisms moveable between an engaged position securing the cover onto the body to allow compaction of refuse therein by the compaction mechanism, and a disengaged position permitting removal of the cover from the open top; and
      a loading door formed in an end of the body adjacent the compaction mechanism for receiving refuse from the compaction mechanism.

16. A stackable refuse collection container and refuse collection vehicle as claimed in claim 15 wherein the compaction mechanism is mounted on the chassis one of rearward of the container and forward of the container.

17. A stackable refuse collection container and refuse collection vehicle as claimed in claim 15 wherein the body defines a volume larger at the top than at the bottom.

18. A stackable refuse collection container and refuse collection vehicle as claimed in claim 15 wherein the container includes a lifting structure for receiving a lifting mechanism to engage and disengage the container from the chassis.

19. A stackable refuse collection container and refuse collection vehicle as claimed in claim 15 further including lower rails extending along an outer surface of the bottom, the lower rails include apertures extending therethrough for receiving a lifting mechanism to engage and disengage the container from the chassis.

20. A stackable refuse collection container and refuse collection vehicle as claimed in claim 15 further including an upper rail extending along an upper edge of each of the sides, the upper rails include apertures extending therethrough for receiving a lifting mechanism to engage and disengage the container from the chassis.

21. A stackable refuse collection container and refuse collection vehicle as claimed in claim 15 further including a discharge door formed in the body.

22. A stackable refuse collection container and refuse collection vehicle as claimed in claim 15 wherein the engagement mechanisms includes securing elements at opposing sides of the top.

23. A stackable refuse collection container and refuse collection vehicle as claimed in claim 22 wherein one of the securing elements is a hinge.

24. A method of collecting refuse comprising the steps of:

providing a refuse collection vehicle including a chassis carrying a compaction mechanism;

providing a plurality of empty stackable refuse collection container, the plurality of containers each including a body having a bottom and an open top constructed to be nestingly stacked with at least one of the remaining plurality of containers through the open top, a cover formed to engage the body and close the top, an engagement mechanism coupled to the body and the cover, the engagement mechanisms moveable between an engaged position securing the cover onto the body to allow compaction of refuse therein by the compaction mechanism, and a disengaged position permitting removal of the cover from the open top, and a loading door formed in an end of the body;

mounting an empty first one of the plurality of containers, with an engaged cover, on the chassis of the refuse collection vehicle with loading door positioned adjacent the compaction mechanism for receiving refuse from the compaction mechanism;

using the compacting mechanism, introducing and compacting refuse in the first one of the plurality of containers;

removing the first one of the plurality of containers with compacted refuse therein; and mounting an empty second one of the plurality of containers on the chassis of the refuse collection vehicle with loading door positioned adjacent the compaction mechanism for receiving refuse from the compaction mechanism.

25. A method as claimed in claim 24 further including a step of loading the first one of the plurality of containers onto a transport vehicle and transporting the first one of the plurality of containers to a site.

26. A method as claimed in claim 25 further including a step of providing a second one of the plurality of containers containing refuse and loading the second one of the plurality of containers onto the transport vehicle and transporting the second one of the plurality of containers with the first one of the plurality of containers to a site.

27. A method as claimed in claim 25 further including as step of discharging compacted refuse from the first one of the plurality of containers and removing the cover from the open top.

28. A method as claimed in claim 27 further including a step of discharging compacted refuse from the second one of the plurality of containers and nestingly stacking the second one of the plurality of containers in the first one of the plurality of containers.

29. A method as claimed in claim 28 further includes the step of placing a stacked plurality of containers on a transport vehicle and transporting the stack to a site.

* * * * *